Patented Nov. 10, 1953

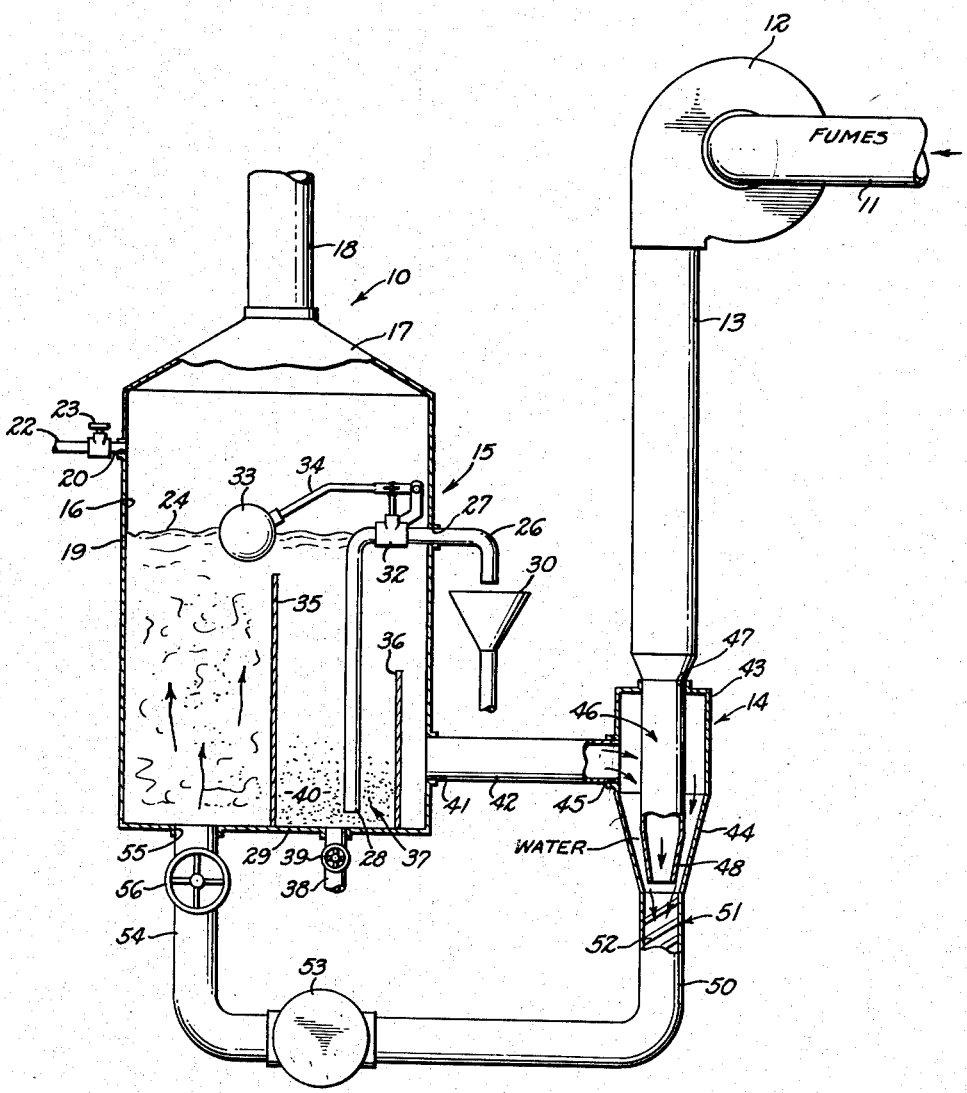

2,658,735

UNITED STATES PATENT OFFICE 2,658,735

GAS-LIQUID CONTACT APPARATUS FOR REMOVING CONTAMINANTS FROM GASES

Vincent C. de Ybarrondo, San Fernando, Calif.

Application August 10, 1950, Serial No. 178,728

1 Claim. (Cl. 261—77)

This invention relates to an apparatus for and a process of removing contaminants from gases and, more particularly, to an apparatus for and process of removing contaminants from gases which are the byproducts of industrial activities.

In recent years a tremendous atmospheric pollution problem has arisen in cities which are the hubs of far-flung and heavily concentrated industrial activities. Manufacturing plants, such as refineries, foundries, chemical producers and lumber mills have poured forth an increasingly greater amount of contaminated gases which are byproducts of their manufacturing processes.

As the contaminated gases are poured forth into the atmosphere, chemical changes take place which render them even more noxious and potentially dangerous than they originally were. This situation has become particularly acute in areas where the normal atmospheric conditions have contributed to the accumulation of such gases over a city for a long period of time.

Among the contaminants present in these gases are fine carbon particles in suspension which generally produce a smoke ranging in density from relatively light to very heavy, depending upon the concentration of such carbon particles. However, many industrial processes produce fumes which resemble smoke, in that they contain solid carbon particles in suspension, but also carry gases or vapors which are very toxic and deleterious in their effects upon the human constitution.

Among the worst of such contaminants are the sulphur compounds such as sulphur dioxide, sulphur trioxide and various other compounds of sulphur, such contaminants emanating particularly in the gases disposed of by chemical plants and oil refineries. Crude petroleum, for instance, is treated in petroleum refineries to remove the mercaptans and other sulphur products, usually by contact with sulphuric acid, so that the refined products, such as gasoline, when burned in motors, or otherwise, do not produce fumes with a large sulphur content. Much of the sulphur originating from such refining processes remains in the sludge resulting from such processes and must be disposed of. Such sludge is commonly burned and the sulphur content passes off in the form of $SO_2$ which oxidizes to form $SO_3$ which combines with fog to constitute droplets of $H_2SO_4$ and produce one component of what is popularly known as "smog."

Of course, there are many other contaminants to be found in the gases emanating from plants of the above described nature, among them being iron oxide and various other chemicals and chemical compounds which are discharged as byproducts of manufacturing processes.

It is, therefore, a primary object of my invention to provide an apparatus for and process of removing contaminants from gases, said apparatus being adapted to be utilized in conjunction with plants where such gases are produced and said method being designed to remove such gases with a modicum of expense.

It has long been recognized that such contaminated gases bear their contaminants in a variety of forms, that is in suspension, solution and intermediate colloidal states and the major problem has been the removal of the various suspensions, solutes or colloids in one continuous operation. Water sprays and other expedients have been tried but they have been proved ineffective to remove a large proportion of the contaminants. I have discovered, however, that the ineffectiveness of water sprays has been due to the fact that globular drops of water produced thereby, due to their surface tension, are not very receptive to alien particles. With my process and apparatus, by mixing contaminated gases and water and violently agitating the mixture, solid particles and water-soluble liquids or gases promptly go into suspension or solution in the water.

Another object of my invention is the provision of an apparatus for and process of removing contaminants from gases in which water is utilized as the cleansing agent, said water being mixed with said gas.

Another object of my invention is the provision of a process for removing contaminants from gases which includes the steps of mixing said contaminated gases with water and subsequently violently agitating said mixture to thoroughly disperse said contaminants through said water.

An additional object of my invention is the provision of a process of the aforementioned type which includes the step of placing said mixture under pressure subsequent to the agitation thereof to more effectively cause said contaminants in said gases to go into solution or suspension with said water.

A further object of my invention is the provision of a process of the aforementioned type in which the contaminated mixture is subjected to a cleansing step to remove the suspensions and solutes therefrom and to permit the recirculation of at least a portion of the water in the process, thus preventing the utilization of impracticable amounts of water. This step is particularly important where water supplies tend to be relatively restricted and especially so in large metropolitan areas such as New York and Los Angeles.

Another object of my invention is the provision of an apparatus for purifying contaminated gases which includes a source of water connected to a source of contaminated gas and a mixer adapted to mix said water with said contaminated gas in proportion to the volume of the latter.

An additional object of my invention is the provision of an apparatus of the aforementioned character wherein said gas is compressed in order to facilitate the mixture of said gas with said water.

A further object of my invention is the provision in a device of the aforementioned character of agitating means adapted to agitate the mixture of water and contaminated gas to facilitate the going into solution or suspension with said water of the contaminants in said gas.

Another object of my invention is the provision of pressurizing means adapted to subject said agitated mixture to increased pressure to further facilitate the process of causing the contaminants in said gas to go into solution or suspension with said water.

An additional object of my invention is the provision of an apparatus of the aforementioned character which can be utilized in conjunction with trucks, automobiles, locomotives of various types, and incinerators.

Other objects and advantages of my invention will be apparent from a consideration of the following specification and the accompanying drawing, which is for the purpose of illustration only, and in which the single figure is a partly sectional, partly elevational view of an apparatus constructed in accordance with my invention and adapted to be utilized in the practice of the process which is the subject thereof.

In discussing the operation of the apparatus and the practice of my invention, the removal of three contaminants, namely, carbon particles and sulphur dioxide and trioxide, will be described, it being understood that the apparatus and process are equally effective in removing other contaminants to be found in such gases.

The apparatus is indicated generally at 10 in the figure and includes a duct 11 connected to a source of gas such as the stack associated with a sludge disposal unit in an oil refinery. Connected to the opposite end of the duct 11 is a pump or compressor 12 which is adapted both to draw the gas through the duct 11 and to compress it and subsequently force in into a duct 13, the lower end of the duct 13 being connected to a mixer 14, for a purpose which will be described in greater detail below.

Disposed adjacent the mixer 14 is a substantially cylindrical container 15, said container defining a chamber 16 the upper end of which is closed by a frusto-conical top 17 communicating with an outlet pipe 18, for a purpose which will be described in greater detail below. Attached to the side wall 19 of the container 15 and communicating with the chamber 16 in the interior thereof through an opening 20 formed in said side wall is a water inlet pipe 22, said pipe having associated therewith a control valve 23 adapted to permit water to flow into the chamber 16 to replenish the supply of water within the chamber. It should be understood that the valve 23 may be manually controlled or may be automatically actuable so that a predetermined amount of replenishing water can be automatically fed into the interior of the chamber 16 to replenish the supply of water contained therein.

The optimum level at which the supply of treating water is to be maintained is indicated at 24, excess water being bled off through a waste pipe 26 communicating with the interior of the chamber 16 through an orifice 27 formed in the wall 19 of the container 15 and having its lower end 28 juxtaposed to the bottom 29 of the container 15. The other end of the waste pipe 26 is juxtaposed to or in communication with a sewer 30 or other place of disposal of waste water. The flow of water through the drainage pipe 26 is controlled by a valve 32, said valve 32 being actuatable by a float 33 which is connected to the valve 32 by an arm 34.

As the replenishment water fed into the chamber 16 through the pipe 22 by the opening of the control valve 23 causes the level of the water within the chamber 16 to rise, the float 33 rises to open the valve 32 and to permit the flow of waste water through the discharge pipe 26 into the sewer or place of disposal 30 of waste water. Of course, replenishing water flows at all times to cause waste water to be continuously discharged.

Attached to the bottom 29 of the container 15 and projecting upwardly into the chamber 16 to divide the lower portion of said chamber in half is a partition 35. Spaced from and juxtaposed to the wall 19 is a baffle plate 36, the space between the partition 35 and the baffle plate 36 defining a collection chamber 37 adapted to collect detritus such as carbon particles, separated from the contaminated gas by the action of the water. The baffle 36 prevents the return of the detritus into the system with the recirculated water and causes it to be gathered within one place within the chamber 16.

A waste pipe 38 communicates with the chamber 37 and has associated therewith a valve 39, said valve being adapted to be actuated automatically or mechanically to permit the discharge of the detritus, indicated generally at 40, from the chamber 37.

A relatively large aperture 41 is formed in the wall 19 of the container 15 adjacent the baffle plate 36, said aperture having one end of a pipe 42 inserted therein to permit the withdrawal of treating water from the chamber 16 in the container 15, the other end of said pipe being connected to the mixer 14. The mixer 14 includes a substantially cylindrical upper portion 43 which has integrally formed therewith or attached thereto a lower frusto-conical portion 44. An aperture 45 is formed in the side of the mixing chamber constituted by the portions 43 and 44 and is adapted to receive the end of the pipe 42 to permit the introduction of treating water into said chamber.

The lower end of the duct 13 has attached thereto or integrally formed therewith an injector 46 which is of substantially smaller diameter than the duct 13 itself and which is inserted into an orifice 47 in the top of the cylindrical portion 43 of the mixing chamber. The lower end of the injector 46 is tapered to a frusto cone 48 and compressed; contaminated gas forced therethrough by the pump or compressor 12 causes the aspiration of water through the pipe 42 into the mixing chamber and the resultant mixture thereof.

The mixed treating water and gas is then fed into a conduit 50 which has formed on the inner wall thereof agitating means 51 constituted by a spiral flange 52 projecting outwardly from the wall into the path of flow of the mixed water and contaminated gas. The conduit 50 has its opposite end connected to the intake of a pump 53, said pump being adapted to pressurize the mixture of gas and water as it flows from the mixer 14 and the agitator 51. A conduit 54 connected to the outlet of the pump 53 has its upper end in communication with the interior of the chamber 16 through an orifice 55 formed in the bottom 29 of the container 15.

A valve 56 is interposed in the conduit 54 between the orifice 55 and the outlet of the pump 53, said valve being adapted to be automatically or manually actuated to restrict the flow of the mixture therethrough to increase the pressure of the mixture within the conduit 54. Thus, the mixing action of the mixer 14 and the agitating action of the agitator 51 are supplemented by the pressurizing action of the pump 53 in conjunction with the restricting action of the valve 56. The pressurizing of the mixture within the conduit 54 insures that those contaminants which have not previously entered into solution or suspension or into a colloidal state with the water will enter into such suspension, solution, or colloidal state within the duct 54. Of course, the apparatus could be operated at pressures less than atmospheric and the pressurizing of the mixture would result in final pressures below atmospheric pressure.

The operation of the apparatus is as follows: The contaminant-bearing gases are drawn by the pump or compressor 12 through the duct 11 and are discharged thereby into the duct 13 at a pressure somewhat higher than atmospheric. The contaminated gases are discharged into the lower portion 44 of the mixing chamber from the frusto-conical lower end 48 of the injector 46, causing an aspirating effect which increases the flow of treating water from the chamber 16 through the pipe 42 and into the mixing chamber in the lower end of which it is mixed with the contaminated gases issuing from the lower end of the injector 46.

The mixture of water and contaminated gases then proceeds into the upper end of the conduit 50 where it strikes the spiral flange 52 constituting the agitating means 51 of my invention to further disperse the contaminants in the gas into solution or suspension with the water in which they are mixed. The mixture is then drawn through the conduit 50 to the inlet opening of the pump 53 by which it is discharged into the conduit 54.

At the beginning of the decontaminating cycle, the valve 56 is adjusted to pressurize the mixture issuing from the outlet opening of the pump 53 into the conduit 54. This pressurizing causes the contaminants which have resisted entering into solution or suspension with the water to enter into solution or suspension therewith and the mixture then issues into the chamber 16 on one side of the vertical partition 35.

The partition 35 prevents the mingling of the contaminated water with the partially cleansed water on the other side thereof. Of course, the mixture flows at relatively high velocity into the chamber 16 and the gas entrapped therein is released by the upward movement of the mixture into the upper portion of the chamber in a cleansed and purified state whence it is discharged by the discharge pipe 18.

However, the suspended material, such as carbon particles, is carried by the velocity of the flow of water over the top of the partition 35 and into the chamber 37 where it settles to the bottom and may be intermittently withdrawn through the discharge pipe 38 by opening the valve 39. The importance of the baffle 36 is at once apparent, since it prevents the withdrawal of the detritus indicated at 40 from the bottom of the chamber 16 through the orifice 41 into the pipe 42 when the treating water is recirculated through a cleansing and purifying cycle.

Due to the thorough mixing of the water and contaminated gas in the mixer 14 and subsequent agitation thereof by the agitating means 51 coupled with the pressurizing thereof in the conduit 54, the carbon particles that have been caught and held by the water and sulphur dioxide and trioxide have gone into suspension or solution in the water forming sulphurous or sulphuric acid. Since the water is continuously circulated, the acidity thereof would increase indefinitely were it not for the fact that a stream of replenishing water is continuously fed into the chamber 16 through the replenishment pipe 22, while polluted water is cast off to the sewer through the discharge pipe 26. The bulk gas is, however, carbon dioxide, which has a limited solubility in water so that the water soon becomes saturated with carbon dioxide and thereafter the carbon dioxide is continuously released to the surface of the water in the tank and passes to the atmosphere through the discharge pipe 18. The valve 23 is so actuated, either manually or automatically, that the treatment water passing to the mixing chamber of the mixer 14 through the pipe 42 is never saturated with sulphur and may contain as little as 10% thereof. If the saturation of the water with the sulphur becomes too great, the operator further opens the valve 23 to increase the flow of replenishment water through the pipe 22 into the chamber 16.

Heavy black smoke passed through the apparatus loses substantially all of its carbon particles and the gas coming out of the top of the chamber 16 is colorless and unobjectionable. While such an apparatus operates very well to abate this smoke nuisance, its main object is, however, to remove the sulphuric acid fumes which are now allowed to escape into the air and which are decidedly toxic.

I thus provide by my invention an apparatus which is adapted to mix water with contaminated gases, to agitate the resulting mixture to further cause the contaminants in the gases to go into solution and/or suspension with the water, and ultimately to pressurize the mixture to further cause the contaminants to go into further solution and/or suspension in the mixture.

Although I have shown and described a specific apparatus for the practice of the process of my invention, it is, of course, readily apparent that apparatus other than that shown and described may be utilized to practice the process and I, therefore, do not desire to be limited to the specific apparatus shown.

I claim as my invention:

An apparatus for removing contaminants from a gas including: a washing liquid contained in a liquid reservoir; a source of contaminated gas; a mixer directly connected to said source and connected to the liquid reservoir by means of a first line; means for withdrawing liquid from the liquid reservoir through said first line to the mixer for mixing the liquid and contaminated gas; a second line connecting the mixer and the liquid reservoir, said second line having agitating means therein for agitating the resulting mixture, said agitating means comprising a spiral flange projecting outwardly from the wall of said second line into the path of flow of the mixture to the liquid reservoir; and pressurizing means for subjecting the mixture to pressure within the second line to cause at least a portion of said contaminants to go into solution in the liquid, said pressurizing means including a pump for pressurizing the mixture and a valve adapted to restrict the flow of said pressurized mixture into said liquid reservoir.

VINCENT C. DE YBARRONDO.

References Cited in the file of this patent

UNITED STATES PATENTS

| Number | Name | Date |
| --- | --- | --- |
| 824,469 | Cline | June 26, 1906 |
| 943,422 | Knoepfel | Dec. 14, 1909 |
| 1,585,502 | La Chance | May 18, 1926 |
| 1,586,763 | Spencer | June 1, 1926 |
| 1,808,956 | Ketterer | June 9, 1931 |
| 1,939,949 | Bertram | Dec. 19, 1933 |
| 2,057,100 | Jesperson | Oct. 13, 1936 |

FOREIGN PATENTS

| Number | Country | Date |
| --- | --- | --- |
| 302,386 | Great Britain | Dec. 17, 1928 |